Sept. 26, 1967  J. E. MICKSCH ET AL  3,343,996

STORAGE BATTERY COVER

Filed April 12, 1965

INVENTORS
NICHOLAS J JAMMAL
JOSEPH N JAMMAL
JOSEPH E MICKSCH
BY
Watts & Fisher, attys.

United States Patent Office 3,343,996
Patented Sept. 26, 1967

3,343,996
STORAGE BATTERY COVER
Joseph E. Micksch, Nicholas J. Jammal, and Joseph N. Jammal, Ashtabula, Ohio, assignors to Ashtabula Rubber Co., Ashtabula, Ohio
Filed Apr. 12, 1965, Ser. No. 447,338
5 Claims. (Cl. 136—170)

This invention relates to storage batteries and more particularly to a storage battery cover.

The typical storage battery is equipped with a container that has a plurality of cells. Each container cell receives an assembly of interleaved positive and negative plates. Separators are interposed between the plates. The plates of like polarity are connected together by straps each of which has an upstanding post. Each container cell is closed by a battery cover which is apertured to receive two posts.

The battery container and cover are molded products of hard rubber and/or similar materials. The cells and covers must be made of relatively stable materials which are inert to battery electrolyte, sulphuric acid in the case of a lead acid battery. In most applications, it is important that the container and cover have relatively high impact resistance and that they be capable of withstanding relatively wide temperature variations. Materials which are economical and have these physical requirements are, generally speaking, difficult to mold to close tolerances. The result is that effecting a peripheral seal around the cover to the container has, in the past, been relatively difficult. The principle reason for this is that covers and containers vary to the extent that one may have anything from an interference fit to a one-sixteenth inch gap.

The customary practice for effecting a seal between the container and cover has been to insert a cord packing between the cover and container around the perimeter of the cover. This cord packing is intended to fill any space between the container and the cover which space may, as noted above, be as much as one-sixteenth inch. After the cord packing is in place, a hot sealing compound is poured around the perimeter of the cover to effect a seal between the cover and the container. Customarily, this sealing compound is a bituminous material which is poured while hot and then allowed to cool and harden.

This customary practice has several inherent drawbacks. Among these is the cost of manually positioning a cord packing between the cover and the container. Another is that it is up to the judgment of the installer of the cord packing to determine how much of it is required. An additional difficulty is that often the cord packing will accidentally become misplaced so that it fails to perform its intended function of forming a temporary seal between the cover and the container. If inadequate cord packing is provided or if the cord packing is not properly positioned, the result is that quantities of the sealing compound run down into the interior of the container. The "rundowns" result in increased cost due to rejections or in the alternative disassembly and repair. If the rundowns should go undetected, they may result in premature failure and battery performance below rated levels.

With the present invention, a cover is equipped with an integrally molded, flexible sealing lip. This lip is endless and formed about the entire perimeter of the cover. The lip is formed with an inherent resiliency so that when a cover is pressed down into the container, the lip has a spring-like quality which maintains the pressure against the walls of the container effecting a seal. The flexible character of the lip is sufficient to overcome tolerance variations in the cover and the container and form such a peripheral seal. It is effective to seal all but tiny surface irregularities or other flaws in the container too small for the compound to run through.

Accordingly, the primary object of this invention is to provide a novel and improved battery cover which does not require a packing operation prior to pouring of the sealing compound and which effectively insures against "rundowns."

Other objects and a fuller understanding of the invention may be had by referring to the following description and claims taken in conjunction with the accompanying drawing in which:

Figure 1:
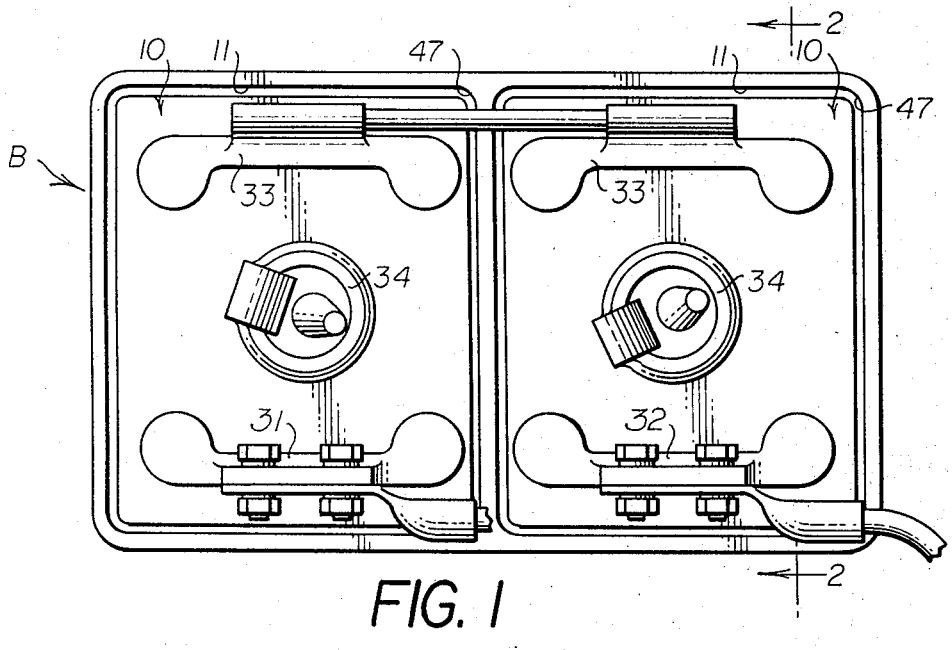
FIGURE 1 is a top plan view of a storage battery.

In the drawings, a storage battery is shown generally at B. The battery shown somewhat diagrammatically in FIGURE 1 is a four volt, industrial lead-acid battery. The battery has a plurality of covers 10 which close cells in a container 11.

Figure 2:
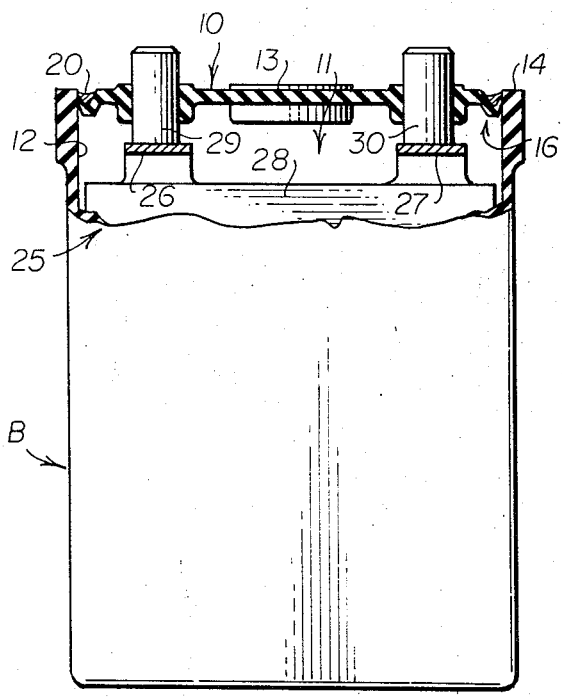
FIGURE 2 is a sectional view of a storage battery cell as viewed from the plane indicated by the line 2—2 of FIGURE 1.
Figure 3:
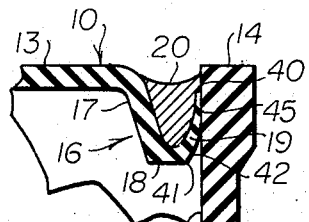
FIGURE 3 is an enlarged fragmentary sectional view of a portion of the container, cover and seal.

As is best seen in FIGURES 2 and 3, the container 11 has smooth innerwalls 12 which define the sides of a cell. The walls 12 are straight and free of lips or other transverse surfaces designed to support and/or register with the cover. As will become more apparent from the ensuing discussion, such lips or cover support surfaces are not required when the novel cover of this invention is employed.

Within each cell of the container 11, there is an assembly of positive and negative plates also known as a cell and shown generally at 25. Positive and negative straps 26, 27 connect the plates of like polarity together electrically and mechanically. Separators 28, only one of which is shown, are interleaved between the plates.

Positive and negative pairs of posts 29, 30 project upwardly respectively from the positive and negative straps 26, 27. Each of the posts 29, 30 extends through its associated cover. Two of the pairs of posts are connected to positive and negative terminals 31, 32, respectively. The cells between these terminals 31, 32 are connected together by a strap 33 which forms a series connections between the cells. Battery caps 34 close suitable filling openings in each of the covers 10.

Figure 5:
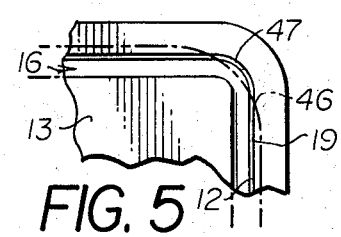
Figure 4:
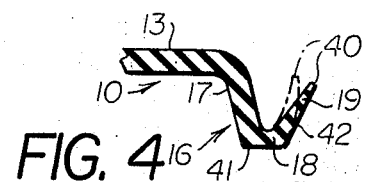
FIGURE 4 is an enlarged fragmentary sectional view of a portion of the cover showing the novel and improved lip in an enlarged form; and, FIGURE 5 is an enlarged fragmentary top plan view of a corner of the cover.

Referring now to FIGURES 3-5, the details of the features of this invention are shown. The cover 10 has a top surface 13 which is designed to be essentially in the plane of top surface 14 of the container 11. The cover 10 has a peripheral sealing rim 16 which depends from the top surface 13. This sealing rim 16 is an endless band around the perimeter of the cover which serves as a bridge between the cover and the container. The rim 16 includes a depending flange portion 17, a base portion 18, and an upstanding, outwardly flaring, tapered sealing lip portion 19. The portions of the rim 16 coact with the wall 12 of the container 11 to define a trough which receives a quantity of sealing compound 20, FIGURES 2 and 3. The sealing compound forms an endless fluid tight seal between the cover and the container.

The lip seal portion 19 tapers to a top knife-like endless edge 40. When the cover is in a relaxed condition, the longitudinal and transverse dimensions of this edge 40 are greater than the maximum opening of a cell in a container falling within the tolerance range for that container.

The lip seal portion 19, at its lower edge, joins with the base portion 18 at 41. The dimensions of the lower edge 41 longitudinally and transversely are less than the dimensions of a cell opening of a container of a minimum size in the tolerance range.

The lip seal portion 19 is capable of flexing from its relaxed position shown in solid lines in FIGURE 4 to the position shown in phantom lines in FIGURE 4 wherein outer surface 42 of the lip seal portion 19 is, as viewed in FIGURE 4, essentially horizontal and normal to the base 18. Since the dimension of the upper edge 40 is greater than a cell of any container in which the cover may be inserted and the dimension of lower edge 41 is less, the lip seal will always be flexed inwardly when the cover is depressed into any container which falls within the tolerance range. In FIGURE 3, the lip is shown deformed somewhat at 45 to indicate this inward deformation by insertion into the container. The inherent resiliency of the lip seal portion forces it tightly against the wall 12 to perfect a peripheral seal.

One of the difficulties in effecting a complete peripheral seal is in effecting a seal at the corner. This difficulty has been overcome in a unique manner which is best understood by reference to FIGURE 5. When the lip seal portion 16 is in its normal shape prior to the insertion into the container it is shaped as shown in phantom in FIGURE 5, rounded at 46 at each corner. The radius of this rounding is greater than the radius of corners 47 of the battery container, FIGURE 1. When the cover is depressed into the container, the inward flexing of the lip seal portion 19 causes the parts of the lip seal at the corners 46 to shift outwardly effecting a seal in the corner of the container. Thus the shape of the flexed lip portion is the shape of the container inner wall 12. Thus, through the provision of a larger cover radius 46 than the container radius 47, an effective seal is obtained which entirely circumscribes the cover.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A storage battery comprising:
   (a) a battery container defining a cell;
   (b) a cell assembly disposed within the cell and including an upstanding positive post and an upstanding negative post;
   (c) a cell cover above the cell assembly and closing the cell, said cell cover including post-receiving apertures through which said positive and negative posts project;
   (d) said cover being an integrally molded one-piece member and having a central portion including a top surface and an endless rim portion circumscribing said central portion;
   (e) each such rim portion including a depending flange portion extending downwardly from the perimeter of the central portion, a base portion disposed below the top surface, and an endless peripheral upstanding outer lip portion;
   (f) said lip portion being oblique with respect to said base portion, said lip portion being tapered, flexible, and resilient and having an upper outer edge above said base portion when the cover is near at the top of the battery, said lip portion including a section near said upper outer edge in inwardly deformed abutment with said container and effecting a seal fluid tight to hot sealing compound; and,
   (g) a quantity of sealing compound covering said rim and forming a fluid tight seal between said cover and said container.

2. The device of claim 1 wherein said lip portion includes rounded corner parts, said corner parts when relaxed having a radius greater than the radius of the inner section of two container side walls defining a corner of a cell.

3. A storage battery comprising:
   (a) a battery container defining a plurality of cells;
   (b) a cell assembly of interleaved positive and negative plates disposed within each such cell, each such cell assembly including an upstanding positive post and an upstanding negative post;
   (c) a cell cover above each such cell assembly and closing each such cell, said cell cover being an integrally molded one-piece member and including post-receiving apertures through which said positive and negative posts project, said cover also including a filling opening;
   (d) each such cover having a central portion with a top surface disposed substantially in a plane, each such cover including an endless rim portion circumscribing said central portion;
   (e) each such rim portion including a depending flange portion extending downwardly from the perimeter of the central portion, a base portion disposed in a plane below and generally paralleling the top surface and an endless peripheral upstanding outer lip portion;
   (f) said lip portion being oblique with respect to said base portion, said lip portion being tapered, flexible, and resilient and having an upper outer edge below the plane of said top surface, said lip portion including a section adjacent said upper outer edge in inwardly deformed abutment with said container and effecting therebetween a seal fluid tight to hot sealing compound;
   (g) said lip portion including corner portions each deformed to a radius less than its radius in an undeformed condition such that the seal effected between the cover and the container is endless; and,
   (h) a quantity of sealing compound covering said rim and forming a fluid tight seal between said cover and said container.

4. In a storage battery including a container defining a plurality of cells and covers closing the cells, the improvement comprising:
   (a) each cover being an integrally molded one-piece member for positioning near the top of and closing one such cell, said cell cover including post-receiving apertures through which positive and negative posts are projectable, said cover also including a filling opening;
   (b) said cover having a central portion with a top surface disposed substantially in a plane, each such cover including an endless rim portion circumscribing said central portion;
   (c) each such rim portion including a depending flange portion extending downwardly from the perimeter of the central portion, a base portion disposed in a plane below and generally paralleling the top surface and an endless peripheral upstanding outer lip portion;
   (d) said lip portion being oblique with respect to said base portion, said lip being tapered, flexible, and resilient and having an upper outer edge below the plane of said top surface, said lip portion including a part near said upper outer edge which is inwardly deformable upon abutment with said container for effecting a seal fluid tight to hot sealing compound; and
   (e) said lip portion having four substantially straight sides and rounded corners therebetween, the radius of each of said rounded corners prior to insertion of the cell cover into the container being greater than the radius of the corners of the container.

5. In a storage battery including a container defining a plurality of cells and unitary covers enclosing the cells, the improvement comprising:
- (a) each cover being an integrally molded, one-piece member for positioning near the top of and closing one such cell, said cell cover including post receiving apertures through which positive and negative posts are projectable, said cover also including a filling opening;
- (b) said cover having a central portion with a top surface disposed substantially in a plane, each such cover including an endless rim portion circumscribing said central portion;
- (c) each such rim portion including a dependent flange portion extending downwardly from the perimeter of the central portion, a base portion disposed in a plane below and generally paralleling the top surface and an endless peripheral upstanding outer lip portion;
- (d) said lip portion being oblique with respect to said base portion, said lip being tapered, flexible, and resilient and having an upper outer edge below the plane of said top surface, said lip portion including a part near said upper outer edge which is inwardly deformable upon abutment with said container for effecting a seal fluid tight to hot sealing compound; and,
- (e) the longitudinal and transverse dimensions of the lip portion edge of each of said covers prior to insertion in said container being greater than the longitudinal and transverse dimensions of the largest of said cells and the longitudinal and transverse dimensions of the base portion of each of said covers being less than the longitudinal and transverse dimensions of each of said such cells whereby to assure that each such lip portion is deformed into such abutment for effecting a seal.

References Cited

UNITED STATES PATENTS

| | | | |
|---|---|---|---|
| 819,159 | 5/1901 | Newbold | 136—170.11 |
| 2,220,005 | 10/1940 | Smith | 136—170 X |
| 3,215,304 | 11/1965 | Rohe | 136—170 |

WINSTON A. DOUGLAS, *Primary Examiner.*

D. L. WALTON, *Assistant Examiner.*